J. H. SEWALL.
BELT TIGHTENER.
APPLICATION FILED APR. 5, 1912.
1,108,085.
Patented Aug. 18, 1914.
2 SHEETS—SHEET 1.
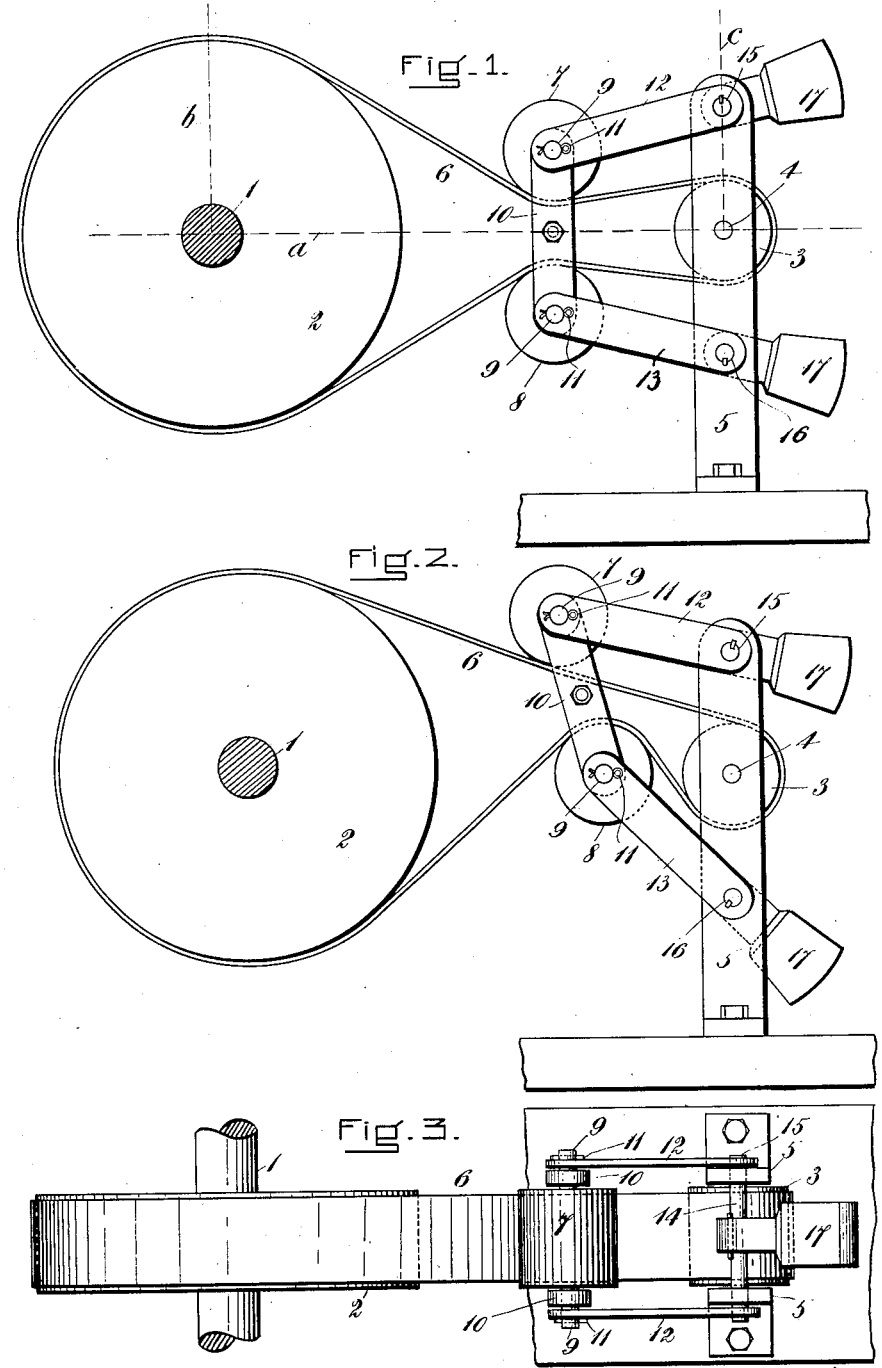

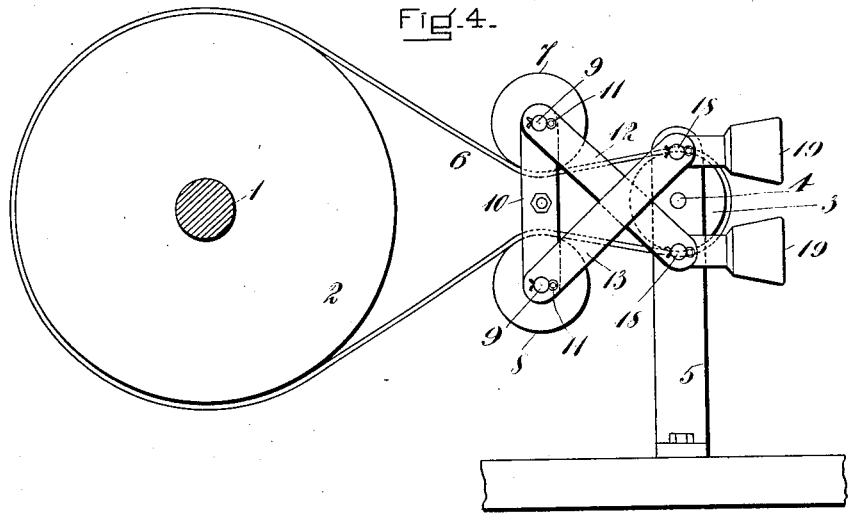
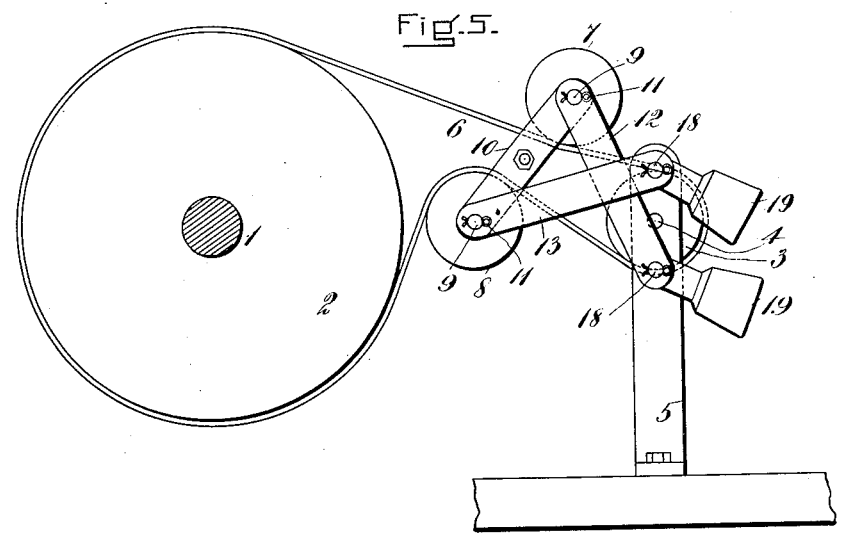
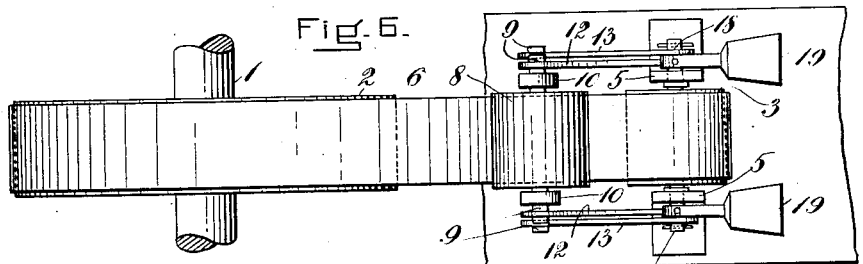

UNITED STATES PATENT OFFICE.

JAMES H. SEWALL, OF KEENE, NEW HAMPSHIRE.

BELT-TIGHTENER.

1,108,085.

Specification of Letters Patent. Patented Aug. 18, 1914.

Application filed April 5, 1912. Serial No. 688,578.

*To all whom it may concern:*

Be it known that I, JAMES H. SEWALL, of Keene, in the county of Cheshire and State of New Hampshire, a citizen of the United States, have invented a new and useful Improvement in Belt-Tighteners, of which the following is a full, clear, and exact description, reference being had to the accompanying drawings, forming a part of this specification, in explaining its nature.

My invention relates to a mechanism or device for regulating, taking up, or compensating for slack or variation in the tension of a belt or the like connecting pulleys or similar parts.

The essential object of my invention is to provide such mechanism or device as will be automatic in its operation and be controlled by the power or pull developed in the belt itself during its operation; and a mechanism or device also that is adapted to automatically regulate, take up or compensate for slack or variation in the tension of a belt connecting pulleys the relative positions of which to one another become changed either by one of said pulleys being brought nearer the other pulley or moved farther away therefrom.

My invention can best be seen and understood by reference to the drawings, in which—

Figure 1 shows the device in side elevation. Fig. 2 is also a side elevation of the device, the parts thereof occupying a changed position from that shown in Fig. 1, and Fig. 3 is a plan of the device. Figs. 4, 5 and 6 are views similar to Figs. 1, 2, and 3, respectively, illustrating a modified construction.

In the drawings:—1 represents a shaft upon which is mounted a pulley 2 which for purposes of illustration will be termed the driving pulley.

3 represents the driven pulley and 4 the shaft of this pulley. For purposes of illustration this pulley is shown mounted between fixtures or uprights 5 through which the shaft 4 of the pulley extends.

6 represents the belt connecting the pulleys. Coöperating with the belt 6 are auxiliary or idler pulleys 7 and 8, respectively. These pulleys are arranged upon shafts 9 which extend through the respective pulleys and beyond the edges of the belt, the auxiliary pulleys being preferably made about the width of the belt. The auxiliary or idler pulleys are connected by arms or links 10 which pivotally connect with the shafts 9 upon which the idler pulleys are mounted. One means of securing such connection is by forming the ends of the arms or links so as to slip over the projecting ends of the shaft 9 and then securing them by cotter pins 11 or other suitable fastenings. Each of the idler pulleys is also pivotally supported by means of links or arms secured to some suitable support. According to the construction shown the idler pulley 7 is pivotally supported by arms or links 12 which pivotally connect with the shaft 9 of this pulley by slipping over the projecting ends of the shaft outside the links 10 and between them and the cotter pins 11. The opposite ends of the arms or links 12 are pivotally secured to the uprights 5. The idler pulley 8 is pivotally supported or carried by links or arms 13 pivotally secured to the ends of the shaft 9 upon which this pulley is arranged by the ends of the links fitting over the ends of the shaft and between the ends of the links 10 and the cotter pins 11 retaining the same. The outer ends of these links are pivotally arranged to turn from the uprights 5. Both sets of links 12 and 13 are pivotally connected with the uprights by fixing the outer ends of the links to shafts 14 which are arranged to turn in and between the uprights at points 15 and 16, respectively. Each of these shafts 14 preferably bears a weight 17 fixed thereto in such manner as to counterbalance the weight of the idler pulleys and connecting links.

Having indicated the various elements or parts, reference will now be made to the relative disposition and arrangement of these parts and also to the principles involved in connection with their mode of operation. This can best be seen and understood when interpreted in the light of various planes of which *a* represents a plane passing through the axes of the main pulleys; *b* represents a plane passing through angles to the plane *a*, and *c* represents a plane passing through the axis of the driven pulley 3 at right angles to the plane *a*.

It is first to be observed that the auxiliary or idler pulleys 7 and 8 located outside the belt are so connected by the links 10 as to normally flex the belt or form angles of flexure in the oppositely running portions 20 and 21 thereof. In other words, the normal arrangement of the idler pulleys is such, that the opposite running portions of the belt before mentioned will, by the differences of pull or tension therein, cause or tend to cause the respective pulleys to move in unison in a direction transverse the plane $a$ or that plane passing through the axes of the respective main pulleys. It is obvious that the portion 20 of the belt running toward the driving pulley will during the operation of the pulleys and belt be maintained under a greater tension than the oppositely moving portions 21 of the belt running off the driving pulley. This is by reason of the pull of the driving pulley upon the belt and the amount of difference of tension in those different parts of the belt will vary depending upon the load on the driven pulley 3. In consequence of there being an increased tension upon the different portions of the belt, the tendency will be for the portion 20 of the belt to draw or bear harder against the idler pulley 7 than the portion 21 of the belt against the pulley 8. Accordingly the portion 20 of the belt bearing against the pulley 7 will, if the belt be flexed, act to move both pulleys 7 and 8 in a direction transverse the plane $a$. From this it is understood why in the normal arrangement of the parts the idler pulleys should be so connected and so coöperate with or engage the belt as to normally flex the same or form angles of flexure in the oppositely running portions 20 and 21 thereof as above described. The auxiliary or idler pulleys are also normally so supported and arranged that as they are moved by the belt in a direction transverse the plane $a$ passing through the axes of the major pulleys as aforesaid, they will also move in reverse or opposite directions longitudinal said plane, one in the direction of the plane $b$ or that plane passing through the axis of the pulley 2 at right angles to the plane $a$, and the other idler pulley in the direction of the plane $c$, or that plane which passes through the axis of the driven pulley at right angles to the plane $a$. This effect is obtained by so pivotally supporting the respective idler pulleys that as they are moved transversely as aforesaid, they will also be induced to move on different and reverse lines of curvature tending in the direction of the planes $b$ and $c$ as above indicated. As I have shown in Fig. 1 of the drawings this effect is obtained by pivoting the arms or links 12 and 13 bearing the respective idler pulleys at separate points outside the plane $a$ whereby these links and the idler pulleys carried by them will be positively moved in the reverse directions above indicated as both idler pulleys are moved in unison in a direction transverse the plane $a$. I prefer that the points at which the arms or links 12 and 13 bearing the respective idler pulleys are pivotally secured shall be on opposite sides of the plane $a$ which extends through the axes of the major pulleys. I also prefer that the arms or links bearing the respective idler pulleys shall be of the same length and shall be pivotally secured at points lying within a plane extending at right angles to the plane $a$ and also at points equidistant therefrom. For these reasons the arms are shown pivotally secured at the points 15 and 16, respectively, and, when in normal position, are oppositely inclined with respect to the plane $a$.

Thus disposed and arranged the parts will operate as follows, and it will first be assumed that the major pulleys are in their normal positions of separation and that slack arises in the belt either by reason of the major pulleys being brought nearer together by the movement of one or both pulleys or otherwise. Immediately upon slack being formed in the belt that portion 20 of the belt running onto the driving pulley will draw harder against the idler pulley 7 than the portion 21 of the belt running off the driving pulley will bear against the idler pulley 8. Thereupon both idler pulleys will be moved in a direction transverse the plane $a$ or a plane passing through the centers of the major pulleys with the effect that the angle in the belt made by the respective idler pulleys will become changed, the one becoming more obtuse as the other becomes more acute, substantially as described in my Letters Patent of the United States No. 1,016,787, of February 6, 1912, and which tends to take up the slack in the belt (see Fig. 2). Another pronounced effect also takes place. As the idler pulleys are moved transversely as aforesaid they will also move in arcs of circles around those points 15 and 16 at which the respective arms or links bearing them are pivoted, with the effect that said idler pulleys are moved in opposite directions longitudinal of the plane $a$, the idler pulley 7 moving toward the plane $b$, and the idler pulley 8 moving toward the plane $c$ (see Fig. 2). As the idler pulleys are thus moved in opposite directions, while the distance separating the pulleys remains the same, that is, that distance defined by the links or arms 10 which connect the respective idler pulleys, yet that distance, at right angles to the plane $a$, which separates the axes of the respective idler pulleys becomes less as the links 10 are inclined to the plane $a$ than when the pulleys were in their normal positions with said links substantially perpendicular to said plane, so that the belt becomes distorted or bent by the idler pulleys in reverse and opposite directions and any slack therein is taken up.

In some cases it is desirable to so arrange the major pulleys and belt connecting the same that the major pulleys may be farther separated from one another during the operation of the belt. In such cases the belt must be made and arranged with such normal amount of slack in it as to allow the major pulleys being farther separated. In such case of course the slack will be normally taken up by the mechanism above described and will permit of the major pulleys being separated, the operation being simply a reversal of that above described. In other words, the normal disposition and arrangement of the parts will be substantially as shown in Fig. 2 which shows the disposition and arrangement of the parts after taking up slack in the belt and which will permit of the major pulleys being separated from one another or moved into positions indicated in Fig. 1 when the operating parts will simply be drawn back into the positions indicated in said Fig. 1. A further advantage of the apparatus resides in the fact that it will operate equally as well whether the belt be running in one direction or the other.

It is obvious that the construction and arrangement of the parts of the apparatus may be varied without departing from its essential principles and mode of operation. As an example I have shown in Figs. 4 and 5 a construction and arrangement different from that shown in Figs. 1 and 2 though with parts operating in substantially the same manner and according to the same principles as those before described. In Figs. 4 and 5 all the parts are the same as in Figs. 1 and 2 excepting that the place and manner of pivotally supporting the links 12 and 13 which connect with and carry the respective idler pulleys. According to the modified construction these links cross one another and connect respectively with the uprights 5 bearing the driven pulley in a manner just reverse to that shown in Figs. 1 and 2. In other words, the link 12 bearing the idler pulley 17 is extended across or beyond the plane $a$ to connect with the uprights at a point below said plane and the link 13 bearing the idler pulley 8 is extended across the plane $a$ to connect with the uprights above said plane. Each of the links 12 and 13 is also independently secured to the uprights by studs 18 on which the links turn, while each of the links is extended by the stud 18 to which it is pivoted and bears upon its end a counterbalancing weight 19, the weights 19 performing the same function as the weights 17 in the construction first described.

Having thus fully described my invention, I claim and desire to secure by Letters Patent of the United States:—

1. The combination with a pair of main pulleys and a belt connecting said pulleys, of mechanism automatically controlled by the difference in the tension in respective opposite running portions of the belt between said main pulleys for taking up variable slack in said belt, said mechanism comprising a pair of auxiliary pulleys engaging said opposite running portions of the belt, and means connecting and movably supporting said auxiliary pulleys to turn about separate axes of which at least one axis lies outside a plane passing through the axes of said main pulleys, whereby both auxiliary pulleys may be moved by said difference in tension in the same general direction transverse said opposite running portions of the belt and with a simultaneous relative change of position longitudinal said running portions of the belt.

2. The combination with a pair of main pulleys and a belt connecting said pulleys, of mechanism automatically controlled by the difference in the tension in respective opposite running portions of the belt between said main pulleys for taking up variable slack in said belt, said mechanism comprising a pair of auxiliary pulleys normally forming angles of flexure in said opposite running portions of the belt, means connecting and movably supporting said auxiliary pulleys to turn about separate axes of which at least one axis lies outside the plane passing through the axes of said main pulleys, whereby both auxiliary pulleys may be moved by said difference in tension in the same general direction transverse said opposite running portions of the belt and with a simultaneous relative change of position longitudinal said running portions of the belt.

3. The combination with a pair of main pulleys and a belt connecting said pulleys, of mechanism automatically controlled by the difference in tension in the respective opposite running portions of the belt for taking up variable slack in said belt, said mechanism comprising a pair of auxiliary pulleys engaging the opposite running portions of the belt, and means connecting and movably supporting said auxiliary pulleys to turn about separate axes lying respectively without and on opposite sides of a plane passing through the axes of said main pulleys, whereby both auxiliary pulleys may be moved by said difference in tension in the same general direction transverse said opposite running portions of the belt and in opposite directions longitudinal said running portions of the belt.

4. The combination with a pair of main pulleys and a belt connecting said pulleys, of mechanism automatically controlled by the difference in tension in the respective opposite running portions of the belt for taking up variable slack in said belt, said mechanism comprising a pair of auxiliary pulleys normally forming angles of flexure in said respective opposite running portions of the belt, means connecting and movably supporting said auxiliary pulleys to turn about separate axes lying respectively without and on opposite sides of a plane passing through the axes of said main pulleys, whereby both auxiliary pulleys may be moved by said difference in tension, both in the same general direction transverse said opposite running portions of the belt and in opposite directions longitudinal of said opposite running portions of the belt.

5. The combination with a pair of main pulleys and a belt connecting said pulleys, of mechanism automatically controlled by the difference in tension in the respective opposite running portions of the belt for taking up variable slack in said belt, said mechanism comprising a pair of auxiliary pulleys engaging respectively opposite running portions of the belt, and means connecting and movably supporting said auxiliary pulleys to turn about separate axes lying respectively without and on opposite sides of a plane passing through the axes of said main pulleys whereby both auxiliary pulleys may be moved by said difference in tension in the same general direction transverse said opposite running portions of the belt and in opposite direction longitudinal of said opposite running portions of the belt, the said means comprising links connecting said auxiliary pulleys to move in unison, and arms supporting said auxiliary pulleys respectively, said arms being pivotally mounted and normally oppositely inclined with respect to said plane.

JAMES H. SEWALL.

Witnesses:
 JOHN E. R. HAYES,
 M. E. FLAHERTY.